Aug. 31, 1948.    G. E. BJÖRKLUND    2,448,348
DENTAL HANDPIECE
Filed June 26, 1945
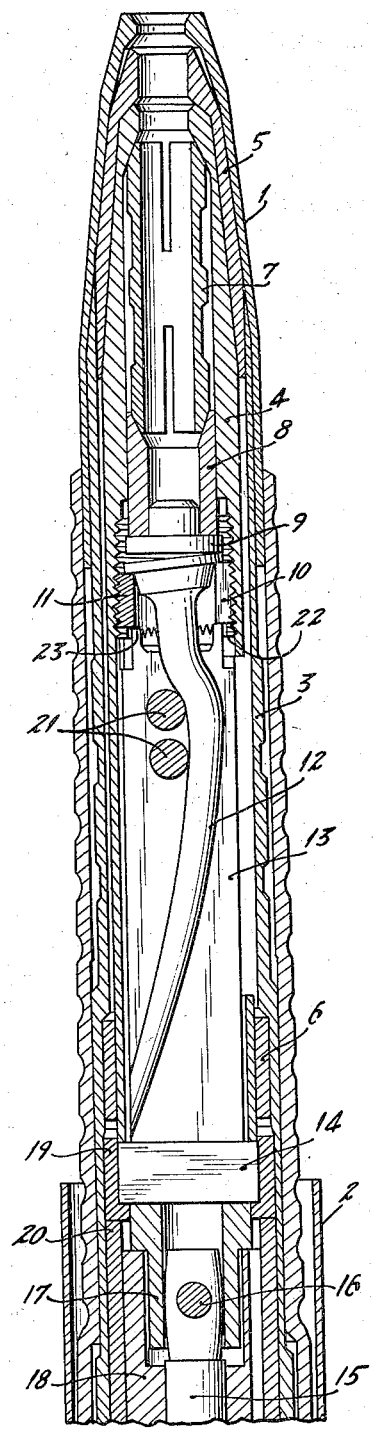
INVENTOR
Gustaf Erik Björklund
BY
Janis C. Marble
his ATTORNEY Patented Aug. 31, 1948

2,448,348

UNITED STATES PATENT OFFICE 2,448,348

DENTAL HANDPIECE

Gustaf Erik Björklund, Stockholm, Sweden

Application June 26, 1945, Serial No. 601,596
In Sweden July 8, 1944

4 Claims. (Cl. 279—51)

This invention relates to handpieces of drilling machines for dental purposes and more specially to the type of handpieces, in which the drill is fastened in the handpiece by means of a jam sleeve or chuck by exposing said sleeve to axial pressure. This is effected by a crank lever, which directly or indirectly acts upon the sleeve. In order to vary the pressure and to make such adjustments possible as are necessary on account of wear, the handpiece is usually provided with an adjusting arrangement. This may simply consist of plates, arranged between the lever and the jam sleeve or an organ transmitting the pressure to this, the thickness of the plates being chosen as wanted. In order to make the adjustment easier instead thereof an adjusting screw is often arranged between the lever and the jam sleeve. However the locking of the screw is combined with certain difficulties and known constructions of this kind are not satisfactory with regard to the demands of solidity and simplicity in the manufacture.

One object of the present invention is therefore to provide a handpiece with an adjusting screw that is to a certain extent automatically locked.

Another object of the invention is to provide a handpiece the different parts of which can mainly be produced by turning and therefore are cheap to manufacture.

Another object of the invention is to provide a handpiece which due to its construction has great solidity and is less liable to become damaged when being used.

Further objects and advantages of the invention will be apparent from the following description in connection with the accompanying drawing, which as an example shows the foremost part of a handpiece according to the invention in longitudinal section.

In the drawing 1 is the front mantle sleeve of the handpiece and 2 the rear mantle sleeve. Inside the sleeve 1 a bearing sleeve 3 is arranged. In the latter a spindle sleeve 4 is journalled in a fore conical bushing 5 and a rear bushing 6. In the central bore of the spindle sleeve a jam sleeve 7 is arranged between a conical shoulder and an intermediate member 8. At the rear end of the intermediate member a plate 9 is fastened. Between the plate 9 and an adjusting ring nut 10 threaded in the spindle sleeve is the fore plate-fashioned part 11 of a crank lever. The part 11 is shaped as a rotary body and centrally arranged on the same is an arm 12 forming the longer lever arm of the crank lever. The lever arm 12 protrudes through the ring nut 10 and extends rearwardly in the spindle sleeve 4. In the latter a forked member 13 is also arranged, the lever arm 12 being placed between the shanks of said member. The forked member is normally prevented from revolving in relation to the spindle sleeve 4 by means of a pin 14, which is placed between the shanks and passed through slots in said sleeve. This pin also serves to transmit the rotary motion of the forked member to the spindle sleeve 4. The forked member in its turn gets its rotation from the driving shaft 15, which is coupled to the rear sleeve-shaped part of said member by means of a pin 16. The rear part of the forked member is provided with a shoulder, which bears against the top of a slide member 18, sliding axially but nonrotatably in relation to the bearing sleeve 3. In a similar way a shoulder ring not shown which is fastened to the shaft 15 bears against the rear end of the slide member by means of which the shaft and the forked member follow the axial movement of the slide member. This is firmly connected with the rear mantle sleeve 2 in a way not shown, so that the axial movement of the slide member can be effected by pushing the mantle sleeve back or forth.

The axial drill pressure acting backwardly on the spindle sleeve is taken up by a supporting ring 19 as the pin 14 bears on an internal shoulder in this ring. The supporting ring travels on the front end of a bushing 20 threaded in the bearing sleeve 3.

In its fore end the forked member 13 is provided with two pins 21, which are fixed in holes in the shanks of the forked member. The lever arm 12 is bent or curved in such a way that the pins 21 slide on the arm thereby putting a lateral pressure on same as the forked member 13 by means of the slide member 18 is pushed backwardly from the position, shown in the drawing. The plate 11 is thereby brought to an angular position and acts as the short lever arm of the crank lever, one side of the plate resting on the adjusting ring nut 10 and the opposite side applying a pressure on the plate 9 and thereby on the intermediate member 8 and the jam sleeve 7. On account of the conical contact surfaces between the jam sleeve and the intermediate member on one side and the jam sleeve and the shoulder in the spindle sleeve 4 on the other the jam sleeve will thus be compressed so that a drill inserted in same will be firmly fastened. The drill may be loosened by the forked member being pushed forwardly to the position shown.

In order to make possible easy adjustment of the axial pressure put upon the jam sleeve by the crank lever the adjusting ring nut 10 is threaded in the spindle sleeve 4. On its rear side the ring nut is provided with teeth 22 which mesh with corresponding teeth 23 in the fore end of the forked member 13, when this member is in the position shown in the drawing. When the axial pressure is to be adjusted the bearing sleeve 3 and the supporting ring 19 are removed in order to allow the pin 14 to be taken off. By turning the shaft and the forked member in relation to the spindle sleeve 4 the adjusting ring nut may be set in the proper position whereupon the teeth are disengaged by the forked member being drawn out of the spindle sleeve 4 a little in order to allow the forked member to be replaced in its original position in relation to the spindle sleeve. After that the pin 14 can be brought to its normal position in the spindle sleeve.

The adjusting ring nut 10 is split and therefore elastic or resilient. As the ring nut is so dimensioned that it is compressed when it is screwed in the spindle sleeve 4 it is selflocking to a certain extent.

The crank lever is manufactured by turning whereupon the lever arm 12 is bent to its proper form.

The invention may however be executed in other embodiments than the one described. By way of an example the crank lever may have any convenient form. The execution of the sliding member acting upon the crank lever may also be varied in different ways.

What I claim is:

1. In a handpiece, a spindle sleeve, a jam sleeve arranged in said spindle sleeve, an adjusting ring nut coaxial with said spindle sleeve and said jam sleeve and threaded in said spindle sleeve, a crank lever having a part constituting a short lever arm, which is shaped as a plate and preferably as a rotary body and is arranged between said jam sleeve and said ring nut and having a longer lever arm passing through said ring nut and being centrally arranged on said part, and means for exposing said longer lever arm to lateral pressure.

2. In a handpiece, a spindle sleeve, a jam sleeve arranged in said spindle sleeve, an adjusting elastic locking ring nut coaxial with said spindle sleeve and said jam sleeve and threaded in said spindle sleeve, a crank lever having a part constituting a short lever arm, which is arranged between said jam sleeve and said ring nut and having a longer lever arm passing through said ring nut, and means for exposing said lever arm to lateral pressure.

3. In a handpiece, a spindle sleeve, a jam sleeve arranged in said spindle sleeve, an adjusting ring nut coaxial with said spindle sleeve and said jam sleeve and threaded in said spindle sleeve and being provided with teeth on its rear side, a crank lever having a part constituting a short lever arm, which is arranged between said jam sleeve and said ring nut and having a longer lever arm passing through said ring nut, an axially movable sliding member which is coaxial with the ring nut and provided with teeth on its fore end, said longer lever arm being inclined with respect to the direction of movement of said sliding member, and means carried by said sliding member and engaging said longer lever arm to apply lateral pressure to the longer lever arm when the sliding member is moved axially.

4. In a handpiece, a spindle sleeve, a jam sleeve arranged in said spindle sleeve, an elastic adjusting ring nut coaxial with said spindle sleeve and said jam sleeve and threaded in said spindle sleeve and being provided with teeth on its rear side, a crank lever having a part constituting a short lever arm which is arranged between said jam sleeve and said ring nut and having a curved longer lever arm passing through said ring nut, a sliding forked member which embraces the curved lever arm and is coaxial with the ring nut and provided with teeth on its fore end, and one or more pins or the like passing through the shanks of the forked member and engaging the curved lever arm thereby putting lateral pressure on same when the forked member is pushed axially.

GUSTAV ERIK BJÖRKLUND.

REFERENCES CITED

The following references are of record in the file of this patent:

UNITED STATES PATENTS

| Number | Name | Date |
|---|---|---|
| 491,316 | Law et al. | Feb. 7, 1893 |
| 491,317 | Law et al. | Feb. 7, 1893 |
| 585,845 | Jones | July 6, 1897 |
| 816,069 | Brown | Mar. 27, 1906 |
| 1,388,617 | Stonbrough | Aug. 23, 1921 |
| 1,438,021 | Crossley | Dec. 2, 1922 |
| 1,479,606 | Impey | Jan. 1, 1924 |